United States Patent [19]

Kousaka et al.

[11] Patent Number: 5,556,925
[45] Date of Patent: Sep. 17, 1996

[54] POLYURETHANE RESIN, PROCESS FOR PREPARING THE SAME AND PRINTING INK FOR LAMINATE CONTAINING THE SAME

[75] Inventors: Katsumi Kousaka; Takahiko Inoue; Takahito Miyamoto, all of Osaka, Japan

[73] Assignee: Sakata Inx Corporation, Japan

[21] Appl. No.: 169,216

[22] Filed: Dec. 20, 1993

[30] Foreign Application Priority Data

Dec. 28, 1992 [JP] Japan .................................. 4-348068
Dec. 7, 1993 [JP] Japan .................................. 5-306774

[51] Int. Cl.⁶ .......................... C08F 20/00; C08G 18/66
[52] U.S. Cl. ..................... 525/440; 525/403; 525/410; 528/76; 528/83
[58] Field of Search ................... 525/440, 410, 525/403; 528/76, 83

[56] References Cited

U.S. PATENT DOCUMENTS 4,719,247  1/1988  Lin et al. ................................ 521/159

FOREIGN PATENT DOCUMENTS

| | | |
|---|---|---|
| 0004937A1 | 5/1979 | European Pat. Off. . |
| 0314347A1 | 1/1989 | European Pat. Off. . |
| 0361419A2 | 11/1990 | European Pat. Off. . |
| 0415177A3 | 1/1991 | European Pat. Off. . |
| 4042267C1 | 9/1990 | Germany . |
| 62-292873 | 3/1987 | Japan . |
| 4-209674 | 7/1992 | Japan . |

*Primary Examiner*—Marion E. McCamish
*Assistant Examiner*—Helen F. Lee
*Attorney, Agent, or Firm*—Pollock, Vande Sande & Priddy

[57] ABSTRACT

Disclosed is a polyurethane resin which is a reaction product of a high molecular weight polyol compound having a molecular weight of 3,000 to 10,000, a low molecular weight polyol compound having a molecular weight of not more than 200, an organic diisocyanate compound, a chain extender, and optionally a reaction terminating agent, wherein the whole of the high molecular weight polyol compound and the low molecular weight polyol compound has an average molecular weight of 1,500 to 2,700; the isocyanate index (I.I.) of the organic diisocyanate compound to the high molecular weight polyol compound satisfies the following condition: I.I.>2.0; and the nitrogen content of the polyurethane resin derived from the isocyanate group of the organic diisocyanate compound is from 1.30 to 1.95% by weight. The polyurethane resin is useful as a binder for a one-component printing ink for a laminate and exhibits excellent blocking resistance and excellent adaptability for boiling or retorting treatment which meet requirements for a printing ink for a laminate.

7 Claims, No Drawings

POLYURETHANE RESIN, PROCESS FOR PREPARING THE SAME AND PRINTING INK FOR LAMINATE CONTAINING THE SAME

BACKGROUND OF THE INVENTION

The present invention relates to a polyurethane resin, a process for preparing the same and a printing ink composition for a laminate containing the same. More particularly, it relates to a polyurethane resin useful as a binder resin for a printing ink for a laminate or the like which exhibits excellent adhesiveness for various kinds of plastic films and blocking resistance, and excellent adaptability for boiling or retorting treatment, a process for preparing the same and a printing ink for a laminate containing the same.

Recent diversification of package bags or containers has required a high degree of performance for printing inks or coating agents used for the ornamentation or surface protection thereof.

For instance, printing inks for plastic films are needed to provide more excellent printability, adhesion to a wider range of films, more excellent blocking resistance and gloss than conventional ones.

Especially, in the field of food packaging, bags or containers made of laminated film materials are used for the reasons that they are sanitary because the content thereof does not come in direct contact with the ink and that they provide a satisfactory appearance as a high grade of printed products.

Generally there are the following two methods for producing such laminated film materials: The one is an extrusion laminating method wherein a plastic film as a printing substrate is printed with an ink, and if necessary, a primer is applied onto the inked surface, and a molten resin such as polyolefin is extruded onto the inked surface. The other is an adhesive laminating method wherein an adhesive is applied onto the inked surface mentioned above, and a plastic film is laminated onto the surface. Accordingly, the laminating inks must be excellent in adhesiveness to the printing substrate as well as in adhesiveness (lamination strength) to a film to be laminated.

In the case of the laminated film materials which further undergo a boiling or retorting treatment wherein the packages made thereof are immersed in hot water for the purpose of cooking or sterilization of the content therein, they are needed to have an adaptability for boiling or retorting treatment which means the performance of preventing delamination through the boiling or retorting treatment.

Most of these performances required for the printing ink mainly depend upon the performance of a resin used as the binder of the ink. Accordingly, in the case of printing inks for plastic film, one or more of various binder resins are selected so as to meet the performance required for individual printing inks.

In general, however, when a resin which hardens an ink film is used as a binder, there is a tendency that the resulting ink film provides blocking resistance but is reduced in adhesion to plastic film and in lamination strength. For instance, in the case of binder resins such as acrylic resins, polyamide resins and polyester resins, an aromatic ring or a highly polar functional group is introduced in the molecule to harden the resin film. However, these means invite the reduction of adhesion and lamination strength. Accordingly, those resins are unsuitable as a binder for an ink to be applied to a wide variety of films or a laminating ink.

On the other hand, polyurethane resins can be improved both in hardness of the coating film thereof and in adhesion to plastic films by increasing the concentration of urethane bond the molecule. An ink containing a polyurethane resin of this type as a binder provides good adhesiveness and lamination strength, as compared with an ink containing other resin which provides an ink film having the same hardness. For the reason, polyurethane resins wherein the concentration of urethane bond is increased as highly as possible have been used as the binder for printing inks to be applied to laminates of plastic films.

However, a polyurethane resin wherein the concentration of urethane bond is increased highly is poor in adaptability for boiling or retorting treatment, which results in failure to give to a printing ink a sufficient adaptability for boiling or retorting treatment. For the purpose of eliminating this problem of insufficient adaptability for boiling or retorting treatment, there is used a two-component reaction type printing ink composed of one component containing a polyurethane resin and the other component containing a polyisocyanate compound as a curing agent.

However, the two-component reaction type printing ink has various problems as follows: Since the main component must be mixed with the curing agent immediately before printing, the ink is inconvenient in handling, the pot life is short and the remaining ink after printing is unstable. Further, the use of expensive curing agent raises costs of packaging bags or containers.

It is an object of the present invention to provide a polyurethane resin useful as a binder resin for use in a printing ink for laminate or the like.

Another object of the present invention to provide a process for preparing the polyurethane resin.

Still another object of the present invention is to provide a printing ink for a laminate containing the polyurethane resin.

These and other objects of the present invention will become apparent from the description hereinafter.

SUMMARY OF THE INVENTION

The present invention provides a polyurethane resin which is a reaction product of a high molecular weight polyol compound having a molecular weight of 3,000 to 10,000, a low molecular weight polyol compound having a molecular weight of not more than 200, an organic diisocyanate compound, a chain extender, and optionally a reaction terminating agent, wherein the whole of the high molecular weight polyol compound and the low molecular weight polyol compound has an average molecular weight of 1,500 to 2,700; the isocyanate index (I.I.) of the organic diisocyanate compound to the high molecular weight polyol compound satisfies the following condition: I.I.> 2.0; and the nitrogen content of the polyurethane resin derived from the isocyanate group of the organic diisocyanate compound is from 1.30 to 1.95% by weight.

Further, the present invention provides a process for preparing a polyurethane resin comprising the steps of:

reacting a high molecular weight polyol compound having a molecular weight of 3,000 to 10,000 and a low molecular weight polyol compound having a molecular weight of not more than 200 with an organic diisocyanate compound in such amounts that the whole of the high molecular weight polyol compound and the low molecular weight has an average molecular weight of 1,500 to 2,700;

the isocyanate index (I.I.) of the organic diisocyanate compound to the high molecular weight polyol compound satisfies the following condition: I.I.> 2.0; and the nitrogen content of the resulting polyurethane resin derived from the isocyanate group of the organic diisocyanate compound is from 1.30 to 1.95% by weight, thereby yielding a urethane prepolymer having a free isocyanate group at the end thereof, and reacting the urethane prepolymer with a chain extender and optionally, further with a reaction terminating agent.

Moreover, the present invention provides a printing ink composition for a laminate comprising the above-mentioned polyurethane resin, a coloring agent and an organic solvent as the essential ingredients.

Herein, the wording "isocyanate index (I.I.)" is intended to mean the ratio of the equivalents of isocyanate group to the equivalents of hydroxyl group.

DETAILED DESCRIPTION

The relationship between the urethane bond concentration in the molecule of a polyurethane resin, and the characteristics of the coating film obtained from the resin and of the ink containing the resin is as follows:

When the urethane bond concentration of the polyurethane molecule is increased, the intermolecular force is increased and therefore the hardness and heat resistance of the coating film obtained from the resin are improved, which results in an improvement in the blocking resistance of an ink containing the resin. On the other hand, the urethane bond hinders the movement of molecules, which lowers the stress relaxation ability of the coating film of the resin against external stress such as heat stress or impact stress. Accordingly, when a polyurethane resin wherein the urethane bond concentration is high is used as a binder for a laminating ink, external stress such as heat stress or impact stress applied to the laminate remains as residual stress as it is, or the interface between the printing substrate and the ink film in the laminate is directly subject to such an external stress without relaxation, which causes the lowering of adhesion of the ink film and also the lowering of lamination strength of the laminate.

Urethane bond in a polyurethane resin does not only increase intermolecular force to improve the hardness of the resin film, but also contributes to the enhancement of adhesion of the resin to the surface of a plastic film due to its mutual interaction with the surface. Accordingly, in the case of a polyurethane resin used as a binder for a laminating ink, even though its concentration of urethane bond is increased, which lowers the stress relaxation ability of the ink film, the polyurethane resin still maintains fairly good adhesiveness and laminating strength, as compared with other resins having the same level of stress relaxation ability.

In the case of conventional inks containing a polyurethane resin as a binder, there was adopted the way wherein the hardness of the ink film is improved to obtain the blocking resistance by adjusting the concentration of urethane bond to as a high degree as possible within such a range that the adhesion of the ink and the lamination strength are not remarkably lowered.

However, when a printing ink wherein a polyurethane resin having such a high concentration of urethane bond is used as a binder is used for a laminate bag, delamination of the laminate occurs through a boiling or retorting treatment due to the poor ability of heat stress relaxation and the enhanced hydrophilic property (poor water resistance) of the polyurethane resin. That is, the polyurethane resin is deficient in adaptability for boiling or retorting treatment.

Then, the present inventors have tried to develop a polyurethane resin with blocking resistance at as low urethane bond concentration as possible. As a result, the present inventors have found a polyurethane resin having such a molecular structure that there are both many dense portions and many sparse portions of urethane bond in one molecule. This polyurethane resin can be obtained by the preparation process wherein a high molecular weight polyol compound having a molecular weight of 3,000 to 10,000 and a low molecular weight polyol compound having a molecular weight of not more than 200 are used in combination in a specific proportion range, the polyol compounds are reacted with an organic diisocyanate compound in such amounts that the isocyanate index (I.I.) of the organic diisocyanate compound to the high molecular weight polyol compound satisfies the following condition: I.I.> 2.0, and the nitrogen content derived from the isocyanate group in the resulting polyurethane resin is specified into a range of 1.30 to 1.95% by weight.

When the polyurethane resin having such a molecular structure is used as a binder for a laminating ink, the blocking resistance and the adhesion or lamination strength which are required for the laminating ink are both improved because the dense urethane bond portion effectively contributes to the improvement of blocking resistance for which the ink film is required to have hardness, and the sparse urethane bond portion effectively contributes to the improvement of adhesion or lamination strength for which a stress relaxation ability is required.

The ink is also improved in adaptability for boiling and retorting treatment because the urethane bond concentration in the molecule is lowered as much as possible. Further, the localization of the above-mentioned dense urethane bond portion and sparse urethane bond portion can be further promoted by the specified process for preparing a polyurethane resin in accordance with the present invention, thereby providing more satisfactory results.

Incidentally, heretofore there are known a technique wherein a high molecular weight polyol compound and a low molecular weight polyol compound are used in combination as a polyol component in preparation of polyurethane resins as an ink binder, and another technique wherein a high molecular weight polyol compound is reacted with an organic diisocyanate compound to give a urethane prepolymer and the prepolymer is subjected to a chain extension reaction using a low molecular weight polyol compound. However, these techniques are merely directed to the adjustment of the urethane bond concentration in the molecule. Thus the techniques neither teach nor suggest the very important features of the present invention that the average molecular weight of the whole of a high molecular weight polyol compound and a low molecular weight polyol compound is specified to a specific range, that the isocyanate index of an organic diisocyanate compound to the high molecular weight polyol compound is specified to a specific range, and that the nitrogen content derived from the isocyanate group in the polyurethane resin is specified to a specific range, and the combination of these features.

The effects of the present invention can be realized only by precisely specifying the molecular structure and the urethane bond concentration of a polyurethane resin to localize the dense urethane bond portion and the sparse urethane bond portion. In this point, the technical idea of the present invention is entirely different from that of the conventional techniques wherein only the concentration of urethane bond is adjusted.

The polyurethane resin, the process for preparing the same and the printing ink composition for a laminate containing the same in accordance with the present invention will be explained in detail.

The polyurethane resin of the present invention is obtained by reacting a high molecular weight polyol compound having a molecular weight of 3,000 to 10,000 and a low molecular weight polyol compound having a molecular weight of not more than 200 with an organic diisocyanate compound to give a urethane prepolymer, and reacting the urethane prepolymer with a chain extender and optionally, further with a reaction terminating agent.

In the first place, the high molecular weight polyol compound and the low molecular weight polyol compound will be explained.

As the high molecular weight polyol compound, there can be used polyester polyols, polycarbonate polyols, polyethercarbonate polyols, polybutadiene polyols, polycaprolactone polyols and polyether polyols, which are usually used in preparation of polyurethane resins. These polyol compounds can be used alone or in admixture. Usually diol compounds are preferably used among these polyol compounds.

The polyester polyols include ones prepared by condensation reaction of one or more dibasic acids and their anhydrides such as adipic acid, phthalic anhydride, isophthalic acid, maleic acid, fumaric acid, succinic acid with one or more glycols such as ethylene glycol, diethylene glycol, propylene glycol, 1,4-butanediol, 3-methyl- 1,5-pentanediol, neopentyl glycol and 1,6-hexanediol.

The polycarbonate polyols include generally used ones wherein the unit derived from 1,6-hexanediol is a basic structural unit and further ones prepared by known processes, for example, polycarbonate polyols prepared from one or more carbonate components such as alkylene carbonate, diarylcarbonate and dialkylene carbonate, and phosgen and one or more glycol components including straight-chain glycols such as 1,3-propanediol, 1,4-butanediol and 1,6-hexanediol, and branched glycols such as 1,2-propanediol, 1,3-butanediol, neopentyl glycol and 3-methyl-1,5-pentanediol.

Incidentally, polyether polyols could not entirely be empolyed for uses wherein an adaptability for boiling or retorting treatment is required. In the present invention, however, even single use of polyether polyols including polyoxyalkylene glycols such as polyethylene glycol, polypropylene glycol and polyoxytetramethylene glycol, and addition products of bisphenol A with alkylene oxides is able to provide a satisfactory adaptability for boiling treatment. Further, the use of the polyether polyol in combination with an appropriate amount of the above-mentioned other high molecular weight polyol compound is able to provide a satisfactory adaptability for retorting treatment.

The molecular weight (number average molecular weight, hereinafter the same) of the high molecular weight polyol compound is from 3,000 to 10,000, preferably from 3,500 to 8,000, more preferably from 5,500 to 7,000. When the molecular weight of the high molecular weight polyol compound is less than the above range, the resulting printing ink is poor in adhesiveness and adaptability for boiling or retorting treatment. When the molecular weight is more than the above range, the resulting printing ink is poor in blocking resistance.

As the low molecular weight polyol compound, there can be used aliphatic diols such as ethylene glycol, 1,2-propanediol, 1,3-propanediol, 1,3-butanediol, 1,4-butanediol, neopentyl glycol, pentanediol, 3-methyl- 1,5-pentanediol, hexanediol, octanediol, diethylene glycol and triethylene glycol, and alicyclic diols such as 1,3-cyclohexanediol and 1,4-cyclohexanediol. These diols can be used alone or in admixture. Further these diols can be used in combination with three or more functional polyols such as glycerin, trimethylolpropane, trimethylolethane, 1,2,3-butanetriol, pentaerythritol and sorbitol.

The molecular weight of the low molecular weight polyol compound is not more than 200, preferably not more than 120. The lower limit of the molecular weight is about 60. When the molecular weight of the low molecular weight polyol compound is more than the above range, the resulting printing ink is poor in blocking resistance.

As the organic diisocyanate compound, there can be used aromatic diisocyanates such as 1,5-naphtalenediisocyanate, 4, 4'-diphenylmethanediisocyanate and tolylenediisocyanate, aliphatic diisocyanates such as hexamethylenediisocyanate and 2,2,4-trimethyl hexamethylenediisocyanate, and alicyclic diisocyanates such as cyclohexane- 1,4-diisocyanate, isophorone diisocyanate, 1,3-bis(isocyanatomethyl)cyclohexane, and aroaliphatic diisocyanates such as xylylenediisocyanate and $\alpha,\alpha,\alpha'$, $\alpha'$-tetramethylxylylenediisocyanate. These isocyanate compounds can be used alone or in admixture.

As the chain extender, there can be used aliphatic diamines such as ethylenediamine, propylenediamine and hexamethylenediamine, alicyclic diamines such as isophorone diamine and 4,4'-dicyclohexylmethanediamine, aromatic diamines such as tolylenediamine, aroaliphatic diamines such as xylylenediamine, diamines containing hydroxyl group such as N-(2-hydroxyethyl)ethylenediamine, N-(2-hydroxyethyl)propylenediamine and N,N'-di (2-hydroxyethyl)ethylenediamine, and hydrazine.

Polyamines such as diethylenetriamine and triethylenetetramine can be used in combination with the foregoing chain extenders in such an amount that the resulting polyurethane resin does not cause gelling.

Incidentally, the above-mentioned low molecular weight polyol compound can be used as a chain extender. However, the use thereof as a chain extender is not preferable because the molecular weight of the resulting polyurethane resin is not sufficiently high, resulting in poor blocking resistance.

In the preparation of a polyurethane resin in accordance with the present invention, a reaction terminating agent can be optionally used, including monoalkylamines such as n-propylamine and n-butylamine, dialkylamines such as di-n-butylamine, alkanolamines such as monoethanolamine and diethanolamine, and monoalcohols such as ethanol.

Next, the process for preparing a polyurethane resin in accordance with the present invention will be explained.

The proportions of the starting materials used for the preparation of the polyurethane resin of the present invention are as follows:

The ratio of the high molecular weight polyol compound having a molecular weight of 3,000 to 10,000 to the low molecular weight polyol compound having a molecular weight of not more than 200 is selected so that the average molecular weight of the whole of both polyol compounds is from 1,500 to 2,700, preferably from 1,700 to 2,400.

Herein, the wording "average molecular weight of the whole of both polyol compounds" is intended to mean the sum of the product of the molecular weight and the mole fraction of the high molecular weight polyol compound and the product of the molecular weight and the mole fraction of the low molecular weight polyol compound.

When the average molecular weight of the whole of both polyol compounds is less than the above range, the adaptability for boiling or retorting treatment becomes poor. When the average molecular weight is more than the above range, the blocking resistance becomes poor.

The ratio of the organic diisocyanate compound to the polyol compounds is selected so that the isocyanate index (I.I.) of the organic diisocyanate compound to the high molecular weight polyol compound satisfies the condition: I.I.> 2.0, and the isocyanate index (I.I.) of the organic diisoycanate compound to the whole of both polyol compounds satisfies: $1.3 \leq I.I. \leq 2.0$. When I.I. of the organic diisocyanate compound to the high molecular weight polyol compound is less than the above range, the blocking resistance becomes poor. When I.I. of the organic diisocyanate compound to the whole of both polyol compounds is more than the above range, the adaptability for boiling or retorting treatment becomes poor, and when I.I. is less than the above range, the blocking resistance becomes poor.

Further, the amount of the organic diisocyanate compound is selected so that the nitrogen content of the resulting polyurethane resin derived from the isocyanate group is from 1.30 to 1.95% by weight, preferably from 1.55 to 1.80% by weight.

Herein, the nitrogen content derived from the isocyanate group can be calculated by use of the following formula:

$$N_{cont} = (14 \times 2 = W_{iso} = 100)/MW_{iso} \times W_{total})$$

wherein the abbreviations mean as follows:

$N_{cont}$: Nitrogen content derived from the isocyanate group
$W_{iso}$: Weight of the organic diisocyanate compound used
$MW_{iso}$: Molecular weight of the organic diisocyanate compound
$W_{total}$: Total weight of all starting materials used for the polyurethane resin When the nitrogen content of the polyurethane resin derived from the isocyanate group is more than the above range, the adaptability for boiling or retorting treatment of the resulting printing ink for a laminate becomes poor. When the nitrogen content is less than the above range, the blocking resistance of the resulting printing ink for a laminate becomes poor.

With respect to the order of reacting the starting materials in the preparation of the polyurethane resin of the present invention, there can be adopted any of the following processes:

(1) Process wherein a high molecular weight polyol compound having a molecular weight of 3,000 to 10,000 and a low molecular weight polyol compound having a molecular weight of not more than 200 are mixed and thereafter reacted with an organic diisocyanate compound to give a urethane prepolymer having a free isocyanate group at the end thereof, and the prepolymer is reacted with a chain extender and optionally with a reaction terminating agent (hereinafter referred to as "first synthesis process").

(2) Process wherein a high molecular weight polyol compound having a molecular weight of 3,000 to 10,000 and the whole amount of an organic diisocyanate compound are mixed and reacted, then a low molecular weight polyol compound having a molecular weight of not more than 200 is added to the reaction mixture to be reacted with the isocyanate group remaining unchanged, giving a urethane prepolymer having a free isocyanate group at the end thereof, and the urethane prepolymer is reacted with a chain extender and optionally with a reaction terminating agent (hereinafter referred to as "second synthesis process").

(3) Process wherein a high molecular weight polyol compound having a molecular weight of 3,000 to 10,000 is reacted with an organic diisocyanate compound in such mounts that I.I. of the organic diisocyanate compound to the high molecular weight polyol compound satisfies the condition: $1.3 \leq I.I. \leq 2.0$, then a low molecular weight polyol compound having a molecular wight of not more than 200 and an organic diisocyanate compound are added to the reaction mixture in such amounts that I.I. of the organic diisocyanate compound to the low molecular weight polyol compound satisfies the condition: $1.3 \leq I.I. \leq 2.0$ and thereafter the reaction is continued to give a urethane prepolymer having a free isocyanate group at the end thereof, and the urethane prepolymer is reacted with a chain extender and optionally with a reaction terminating agent (hereinafter referred to as "third synthesis process").

(4) Process wherein a high molecular weight polyol compound having a molecular weight of 3,000 to 10,000 is reacted with an organic diisocyanate compound in such amounts that I.I. of the organic diisocyanate compound to the high molecular weight polyol compound satisfies the condition: $1.3 \leq I.I. \leq 2.0$, yielding a urethane prepolymer having a free isocyanate group at the end thereof, and separately a low molecular weight polyol compound having a molecular weight of not more than 200 is reacted with an organic diisocyanate compound in such amounts that I.I. of the organic diisocyanate compound satisfies the condition: $1.3 \leq I.I. \leq 2.0$, yielding a urethane prepolymer having a free isocyanate group at the end thereof, and both the urethane prepolymers are mixed and reacted with a chain extender and optionally with a reaction terminating agent (hereinafter referred to as "fourth synthesis process").

The reason why I.I. is limited to: $1.3 \leq I.I. \leq 2.0$, in the above-mentioned third and fourth synthesis processes is that when I.I. is less than the above range, the blocking resistance becomes poor, and when I.I. is more than the above range, it is difficult to synthesize a urethane prepolymer having a uniform structure.

The reaction condition in the first through fourth synthesis processes is as follows: With respect to the preparation of the prepolymer, the high molecular weight polyol compound and/or the low molecular weight polyol compound are reacted with the organic diisocyanate compound at a temperature of 60° to 130° C., optionally in the presence of an organic solvent and a catalyst, until the hydroxyl group of the polyol compounds disappears. With respect to the chain extension reaction, the prepolymer is reacted with the chain extender and optionally with the reaction terminating agent at a temperature of 30° to 140° C. in the presence of an organic solvent and optionally a catalyst until the remaining isocyanate group disappears.

As the catalyst used in the preparation of the polyurethane resin, there are exemplified a variety of known catalysts including tin(I) octanoate, dibutyltin acetate and tetrabutoxytitanate.

The organic solvent used in the preparation of the polyurethane resin includes well-known solvents for printing inks. Examples of such solvents are aromatic solvents such as benzene, toluene and xylene, alcohol solvents such as methanol, ethanol, isopropyl alcohol and n-butanol, ketone solvents such as acetone, methyl ethyl ketone and methyl isobutyl ketone, ester solvents such as ethyl acetate, butyl acetate and propyl acetate, ethers such as tetrahydrofuran, and polyhydric alcohol derivatives such as ethylene glycol monomethyl ether and ethylene glycol monoethyl ether. These solvents can be used alone or in admixture.

The second, third and fourth synthesis processes among the above-mentioned are preferable from the viewpoint that it is possible to enhance the localization of the dense urethane bond portion and the sparse urethane bond portion, thereby providing greater effects. In particular, the second and third synthesis processes are more preferable from the viewpoint of their simple procedures, and the fourth synthesis process is more preferable from the viewpoint that the degree of localization of the dense urethane bond portion and the sparse urethane bond portion in the resulting polyurehtane molecule can be readily controlled.

The polyurethane resin obtained in the above-mentioned manner preferably has a molecular weight (number average molecular weight, hereinafter the same) of 10,000 to 100,000. When the molecular weight of the polyurethane resin is less than 10,000, the blocking resistance of the resulting printing ink for a laminate become poor. When the molecular weight is more than 100,000, the viscosity of the resulting printing ink for a laminate is increased, resulting in a poor printability.

Then, a printing ink composition for a laminate containing the above-mentioned polyurethane resin as a binder in accordance with the present invention will be explained.

The printing ink composition of the present invention is an organic solvent type printing ink composition for a laminate which contains the polyurethane resin of the present invention, a coloring agent and an organic solvent as the essential ingredients.

As the coloring agent, there can be used inorganic or organic pigments and body pigments which are usually used in printing inks and paints. Examples of the organic solvent to be used are the above-mentioned aromatic hydrocarbon solvents, ketone solvents, ester solvents, polyhydric alcohol derivatives, and alcohol solvents.

If necessary, the ink composition of the present invention can contain a binder resin besides the polyurethane resin of the present invention, for example, chlorinated polyolefins, cellulosic resins, acrylic resins, polyvinyl chloride, vinyl chloride-vinyl acetate copolymers, rosin resins and ketone resins, and a pigment dispersing agent, a wax and other additives.

The printing ink of the present invention preferably contains 5 to 20% by weight of the polyurethane resin of the invention and 1 to 50% by weight of the coloring agent, on the basis of the total amount of the ink composition.

In the preparation of an ink composition using the above-mentioned materials, the coloring agent, the polyurethane resin and optionally the pigment dispersing agent are mixed and kneaded by means of a conventional apparatus for manufacturing an ink such as ball mill, attritor or sand mill, and then remaining ingredients are added thereto and further kneaded.

The printing ink of the present invention prepared in the above-mentioned manner can be applied to printing of various plastic films or sheets as a one-component printing ink and exhibits excellent adhesiveness to various kinds of plastic films and blocking resistance, excellent lamination strength and adaptability for boiling or retorting treatment.

The present invention will be described in more detail by means of the following Examples and Comparative Examples. It is to be understood that the present invention is not limited to the Examples, and various changes and modifications may be made in the invention without departing from the spirit and scope thereof.

EXAMPLE 1

A four-necked flask equipped with an agitator, a thermometer, a Dimroth condenser and a gas introduction pipe was charged with 34.1 parts by weight of isophorone diisocyanate, 200 parts by weight of a polybutylene adipate diol having a molecular weight of 4,000 prepared from adipic acid and 1,4-butanediol, and 4.7 parts by weight of 1,4-butanediol. The reaction was conducted at 100° C. for 10 hours while introducing nitrogen gas. After cooling of the reaction mixture, 192 parts by weight of toluene and 192 parts by weight of methyl ethyl ketone were added to uniformly dissolve the reaction mixture, followed by addition of 192 parts by weight of isopropyl alcohol and 7.4 parts by weight of isophorone diamine. The reaction was further conducted for 20 minutes and terminated by addition of 1.1 parts by weight of n-butylamine to give a polyurethane resin solution (A). The molecular weight of the polyurethane resin was 28,000.

EXAMPLE 2

A four-necked flask equipped with an agitator, a thermometer, a Dimroth condenser and a gas introduction pipe was charged with 34.3 parts by weight of isophorone diisocyanate, 200 parts by weight of a polybutylene adipate diol having a molecular weight of 6,000 prepared from adipic acid and 1,4-butanediol, and 6.3 parts by weight of 1,4-butanediol. The reaction was conducted at 100° C. for 10 hours while introducing nitrogen gas. After cooling of the reaction mixture, 194 parts by weight of toluene and 194 parts by weight of methyl ethyl ketone were added to uniformly dissolve the reaction mixture, followed by addition of 194 parts by weight of isopropyl alcohol and 7.3 parts by weight of isophorone diamine. The reaction was further conducted for 20 minutes and terminated by addition of 1.3 parts by weight of n-butylamine to give a polyurethane resin solution (B). The molecular weight of the polyurethane resin was 28,000.

EXAMPLE 3

A four-necked flask equipped with an agitator, a thermometer, a Dimroth condenser and a gas introduction pipe was charged with 34.3 parts by weight of isophorone diisocyanate, 200 parts by weight of a polybutylene adipate diol having a molecular weight of 6,000 prepared from adipic acid and 1,4-butanediol, and 6.3 parts by weight of 1,4-butanediol. The reaction was conducted at 100 ° C. for 10 hours while introducing nitrogen gas. After cooling of the reaction mixture, 194 parts by weight of toluene and 194 parts by weight of methyl ethyl ketone were added to uniformly dissolve the reaction mixture, followed by addition of 194 parts by weight of isopropyl alcohol, 6.5 parts by weight of isophorone diamine and 0.3 part by weight of diethylenetriamine. The reaction was further conducted for 20 minutes and terminated by addition of 1.4 parts by weight of n-butylamine to give a polyurethane resin solution (C). The molecular weight of the polyurethane resin was 28,000.

EXAMPLE 4

A four-necked flask equipped with an agitator, a thermometer, a Dimroth condenser and a gas introduction pipe was charged with 29.8 parts by weight of isophorone diisocyanate, 200 parts by weight of a polybutylene adipate diol having a molecular weight of 6,000 prepared from adipic acid and 1,4-butanediol, and 6.3 parts by weight of 1,4- butanediol. The reaction was conducted at 100° C. for 10 hours while introducing nitrogen gas. After cooling of the reaction mixture, 187 parts by weight of toluene and 187 parts by weight of methyl ethyl ketone were added to uniformly dissolve the reaction mixture, followed by addition of 187 parts by weight of isopropyl alcohol and 3.7 parts by weight of isophorone diamine. The reaction was further conducted for 20 minutes and terminated by addition of 1.4 parts by weight of n-butylamine-to give a polyurethane resin solution (D). The molecular weight of the polyurethane resin was 26,000.

EXAMPLE 5

A four-necked flask equipped with an agitator, a thermometer, a Dimroth condenser and a gas introduction pipe was charged with 38.8 parts by weight of isophorone diisocyanate, 200 parts by weight of a polybutylene adipate diol having a molecular weight of 6,000 prepared from adipic acid and 1,4-butanediol, and 9.5 parts by weight of 1,4-butanediol. The reaction was conducted at 100° C. for 10 hours while introducing nitrogen gas. After cooling of the reaction mixture, 197 parts by weight of toluene and 197 parts by weight of methyl ethyl ketone were added to uniformly dissolve the reaction mixture, followed by addition of 197 parts by weight of isopropyl alcohol and 4.0 parts by weight of isophorone diamine. The reaction was further conducted for 20 minutes and terminated by addition of 1.6 parts by weight of n-butylamine to give a polyurethane resin solution (E). The molecular weight of the polyurethane resin was 23,000.

EXAMPLE 6 1

A four-necked flask equipped with an agitator, a thermometer, a Dimroth condenser and a gas introduction pipe was charged with 29.0 parts by weight of isophorone diisocyanate, 200 parts by weight of a polybutylene adipate diol having a molecular weight of 6,000 prepared from adipic acid and 1,4-butanediol, and 4.4 parts by weight of 1,4-butanediol. The reaction was conducted at 100° C. for 10 hours while introducing nitrogen gas. After cooling of the reaction mixture, 188 parts by weight of toluene and 188 parts by weight of methyl ethyl ketone were added to uniformly dissolve the reaction mixture followed by addition of 188 parts by weight of isopropyl alcohol and 6.8 parts by weight of isophorone diamine. The reaction was further conducted for 20 minutes and terminated by addition of 1.4 parts by weight of n-butylamine to give a polyurethane resin solution (F). The molecular weight of the polyurethane resin was 26,000

EXAMPLE 7

A four-necked flask equipped with an agitator, a thermometer, a Dimroth condenser and a gas introduction pipe was charged with 34.4 parts by weight of isophorone diisocyanate, 200 parts by weight of a polybutylene adipate diol having a molecular weight of 7,000 prepared from adipic acid and 1,4-butanediol, and 6.7 parts by weight of 1,4-butanediol. The reaction was conducted at 100° C. for 10 hours while introducing nitrogen gas. After cooling of the reaction mixture, 194 parts by weight of toluene and 194 parts by weight of methyl ethyl ketone were added to uniformly dissolve the reaction mixture followed by addition of 194 parts by weight of isopropyl alcohol and 7.3 parts by weight of isophorone diamine. The reaction was further conducted for 20 minutes and terminated by addition of 1.3 parts by weight of n-butylamine to give a polyurethane resin solution (G). The molecular weight of the polyurethane resin was 28,000.

EXAMPLE 8

A four-necked flask equipped with an agitator, a thermometer, a Dimroth condenser and a gas introduction pipe was charged with 34.0 parts by weight of isophorone diisocyanate, 200 parts by weight of a polybutylene adipate diol having a molecular weight of 6,000 prepared from adipic acid and 1,4-butanediol, and 4.3 parts by weight of ehtylene glycol. The reaction was conducted at 100° C. for 10 hours while introducing nitrogen gas. After cooling of the reaction mixture, 192 parts by weight of toluene and 192 parts by weight of methyl ethyl ketone were added to uniformly dissolve the reaction mixture, followed by addition of 192 parts by weight of isopropyl alcohol and 7.2 parts by weight of isophorone diamine. The reaction was further conducted for 20 minutes and terminated by addition of 1.3 parts by weight of n-butylamine to give a polyurethane resin solution (H). The molecular weight of the polyurethane resin was 28,000.

EXAMPLE 9

A four-necked flask equipped with an agitator, a thermometer, a Dimroth condenser and a gas introduction pipe was charged with 34.7 parts by weight of isophorone diisocyanate, 200 parts by weight of a polybutylene adipate diol having a molecular weight of 6,000 prepared from adipic acid and 1,4-butanediol, and 8.4 parts by weight of 3-methyl- 1,5-pentanediol. The reaction was conducted at 100° C. for 10 hours while introducing nitrogen gas. After cooling of the reaction mixture, 196 parts by weight of toluene and 196 parts by weight of methyl ethyl ketone were added to uniformly dissolve the reaction mixture, followed by addition of 196 parts by weight of isopropyl alcohol and 7.2 parts by weight of isophorone diamine. The reaction was further conducted for 20 minutes and terminated by addition of 1.3 parts by weight of n-butylamine to give a polyurethane resin solution (I). The molecular weight of the polyurethane resin was 28,000.

EXAMPLE 10

A four-necked flask equipped with an agitator, a thermometer, a Dimroth condenser and a gas introduction pipe was charged with 34.3 parts by weight of isophorone diisocyanate, 200 parts by weight of a polycaprolactone diol having a molecular weight of 6,000, and 6.3 parts by weight of 1,4-butanediol. The reaction was conducted at 100° C. for 10 hours while introducing nitrogen gas. After cooling of the reaction mixture, 194 parts by weight of toluene and 194 parts by weight of methyl ethyl ketone were added to uniformly dissolve the reaction mixture, followed by addition of 194 parts by weight of isopropyl alcohol, 6.5 parts by weight of isophorone diamine and 0.3 part by weight of diethylenetriamine. The reaction was further conducted for 20 minutes and terminated by addition of 1.4 parts by weight of n-butylamine to give a polyurethane resin solution (J). The molecular weight of the polyurethane resin was 28,000.

EXAMPLE 11

A four-necked flask equipped with an agitator, a thermometer, a Dimroth condenser and a gas introduction pipe was charged with 34.3 parts by weight of isophorone diisocyanate, 200 parts by weight of a polybutylene glycol having a molecular weight of 6,000, and 6.3 parts by weight of 1,4-butanediol. The reaction was conducted at 100° C. for 10 hours while introducing nitrogen gas. After cooling of the reaction mixture, 194 parts by weight of toluene and 194 parts by weight of methyl ethyl ketone were added to uniformly dissolve the reaction mixture, followed by addition of 194 parts by weight of isopropyl alcohol, 6.5 parts by weight of isophorone diamine and 0.3 part by weight of diethylenetriamine. The reaction was further conducted for 20 minutes and terminated by addition of 1.4 parts by weight of n-butylamine to give a polyurethane resin solution (K). The molecular weight of the polyurethane resin was 28,000.

EXAMPLE 12

A four-necked flask equipped with an agitator, a thermometer, a Dimroth condenser and a gas introduction pipe was charged with 77.7 parts by weight of isophorone diisocyanate, 500 parts by weight of a polybutylene adipate diol having a molecular weight of 5,000 prepared from adipic acid and 1,4-butanediol, and 12.4 parts by weight of 1,4-butanediol. The reaction was conducted at 100° C. for 10 hours while introducing nitrogen gas. After cooling of the reaction mixture, 465 parts by weight of toluene and 465 parts by weight of methyl ethyl ketone were added to uniformly dissolve the reaction mixture, followed by addition of 465 parts by weight of isopropyl alcohol and 17.3 parts by weight of isophorone diamine. The reaction was further conducted for 20 minutes and terminated by addition of 1.5 parts by weight of n-butylamine to give a polyurethane resin solution (L). The molecular weight of the polyurethane resin was 60,000.

EXAMPLE 13

A four-necked flask equipped with an agitator, a thermometer, a Dimroth condenser and a gas introduction pipe was charged with 77.7 parts by weight of isophorone diisocyanate and 500 parts by weight of a polybutylene adipate diol having a molecular weight of 5,000 prepared from adipic acid and 1,4-butanediol. The reaction was conducted at 100° C. for 10 hours while introducing nitrogen gas, giving an urethane prepolymer. To the reaction mixture was added 12.4 parts by weight of 1,4-butanediol, and the reaction was further conducted at 100° C. for 10 hours while introducing nitrogen gas. After cooling of the reaction mixture, 465 parts by weight of toluene and 465 parts by weight of methyl ethyl ketone were added to uniformly dissolve the reaction mixture, followed by addition of 465 parts by weight of isopropyl alcohol and 17.3 parts by weight of isophorone diamine. The reaction was further conducted for 20 minutes and terminated by addition of 1.5 parts by weight of n-butylamine to give a polyurethane resin solution (M). The molecular weight of the polyurethane resin was 60,000.

EXAMPLE 14

A four-necked flask equipped with an agitator, a thermometer, a Dimroth condenser and a gas introduction pipe was charged with 33.3 parts by weight of isophorone diisocyanate (I.I. to the following polybutylene adipate diol:1.5) and 500 parts by weight of a polybutylene adipate diol having a molecular weight of 5,000 prepared from adipic acid and 1,4-butanediol. The reaction was conducted at 100° C. for 10 hours while introducing nitrogen gas, giving an urethane prepolymer. To the reaction mixture were added 44.4 parts by weight of isophorone diisocyanate (I.I. to the following 1,4-butanediol:1.8 ) and 12.4 parts by weight of 1,4-butanediol, and the reaction was conducted at 100° C. for 10 hours to give an urethane prepolymer. After cooling of the reaction mixture, 465 parts by weight of toluene and 465 parts by weight of methyl ethyl ketone were added to uniformly dissolve the reaction mixture, followed by addition of 465 parts by weight of isopropyl alcohol and 17.3 parts by weight of isophorone diamine. The reaction was further conducted for 20 minutes and terminated by addition of 1.5 parts by weight of n-butylamine to give a polyurethane resin solution (N). The molecular weight of the polyurethane resin was 60,000.

EXAMPLE 15

A four-necked flask equipped with an agitator, a thermometer, a Dimroth condenser and a gas introduction pipe was charged with 33.3 parts by weight of isophorone diisocyanate (I.I. to the following polybutylene adipate diol:1.5) and 500 parts by weight of a polybutylene adipate diol having a molecular weight of 5,000 prepared from adipic acid and 1,4-butanediol. The reaction was conducted at 100° C. for 10 hours while introducing nitrogen gas, giving an urethane prepolymer. Another four-necked flask equipped with an agitator, a thermometer, a Dimroth condenser and a gas introduction pipe was charged with 44.4 parts by weight of isophorone diisocyanate (I.I. to the following 1,4-butanediol:1.8), 12.4 parts by weight of 1,4-butanediol and 100 parts by weight of methyl ethyl ketone. The content was uniformly dissolved and the reaction was conducted at 79° C. for 15 hours while introducing nitrogen gas, giving an urethane prepolymer. After cooling, both reaction mixtures were combined and 465 parts by weight of toluene and 365 parts by weight of methyl ethyl ketone were added to uniformly dissolve the reaction mixture, followed by addition of 465 parts by weight of isopropyl alcohol and 17.3 parts by weight of isophorone diamine. The reaction was further conducted for 20 minutes and terminated by addition of 1.5 parts by weight of n-butylamine to give a polyurethane resin solution (O). The molecular weight of the polyurethane resin was 60,000.

COMPARATIVE EXAMPLE 1

A four-necked flask equipped with an agitator, a thermometer, a Dimroth condenser and a gas introduction pipe was charged with 39.1 parts by weight of isophorone diisocyanate and 207 parts by weight of a polybutylene adipate diol having a molecular weight of 2,000 prepared from adipic acid and 1,4-butanediol. The reaction was conducted at 100° C. for 10 hours while introducing nitrogen gas. After cooling of the reaction mixture, 193 parts by weight of toluene and 193 parts by weight of methyl ethyl ketone were added to uniformly dissolve the reaction mixture, followed by addition of 193 parts by weight of isopropyl alcohol and 11.9 parts by weight of isophorone diamine. The reaction was further conducted for 20 minutes and terminated by addition of 1.5 parts by weight of n-butylamine to give a polyurethane resin solution (P). The molecular weight of the polyurethane resin was 25,000.

COMPARATIVE EXAMPLE 2

A four-necked flask equipped with an agitator, a thermometer, a Dimroth condenser and a gas introduction pipe was charged with 39.1 parts by weight of isophorone diisocyanate, 200 parts by weight of a polybutylene adipate diol having a molecular weight of 2,000 prepared from adipic acid and 1,4-butanediol, and 3.2 parts by weight of 1,4-butanediol. The reaction was conducted at 100° C. for 10 hours while introducing nitrogen gas. After cooling of the reaction mixture, 193 parts by weight of toluene and 193 parts by weight of methyl ethyl ketone were added to uniformly dissolve the reaction mixture, followed by addition of 193 parts by weight of isopropyl alcohol and 4.7 parts by weight of isophorone diamine. The reaction was further conducted for 20 minutes and terminated by addition of 1.8 parts by weight of n-butylamine to give a polyurethane resin solution (Q). The molecular weight of the polyurethane resin was 22,000.

COMPARATIVE EXAMPLE 3

A four-necked flask equipped with an agitator, a thermometer, a Dimroth condenser and a gas introduction pipe was charged with 43.4 parts by weight of isophorone diisocyanate, 200 parts by weight of a polybutylene adipate diol having a molecular weight of 6,000 prepared from adipic acid and 1,4-butanediol, and 44.4 parts by weight of a polybutylene adipate diol having a molecular weight of 500. The reaction was conducted at 100° C. for 10 hours while introducing nitrogen gas. After cooling of the reaction mixture, 233 parts by weight of toluene and 233 parts by weight of methyl ethyl ketone were added to uniformly dissolve the reaction mixture, followed by addition of 233 parts by weight of isopropyl alcohol and 10.6 parts by weight of isophorone diamine. The reaction was further conducted for 20 minutes and terminated by addition of 1.6 parts by weight of n-butylamine to give a polyurethane resin solution (R). The molecular weight of the polyurethane resin was 27,000.

COMPARATIVE EXAMPLE 4

A four-necked flask equipped with an agitator, a thermometer, a Dimroth condenser and a gas introduction pipe was charged with 24.7 parts by weight of isophorone diisocyanate, 200 parts by weight of a polybutylene adipate diol having a molecular weight of 6,000 prepared from adipic acid and 1,4-butanediol, and 2.0 parts by weight of 1,4-butanediol. The reaction was conducted at 100° C. for 10 hours while introducing nitrogen gas. After cooling of the reaction mixture, 183 parts by weight of toluene and 183 parts by weight of methyl ethyl ketone were added to uniformly dissolve the reaction mixture, followed by addition of 183 parts by weight of isopropyl alcohol and 8.0 parts by weight of isophorone diamine. The reaction was further conducted for 20 minutes and terminated by addition of 1.1 parts by weight of n-butylamine to give a polyurethane resin solution (S). The molecular weight of the polyurethane resin was 29,000.

COMPARATIVE EXAMPLE 5

A four-necked flask equipped with an agitator, a thermometer, a Dimroth condenser and a gas introduction pipe was charged with 46.9 parts by weight of isophorone diisocyanate, 200 parts by weight of a polybutylene adipate diol having a molecular weight of 6,000 prepared from adipic acid and 1,4-butanediol, and 11.6 parts by weight of 1,4-butanediol. The reaction was conducted at 100° C. for 10 hours while introducing nitrogen gas. After cooling of the reaction mixture, 207 parts by weight of toluene and 207 parts by weight of methyl ethyl ketone were added to uniformly dissolve the reaction mixture, followed by addition of 207 parts by weight of isopropyl alcohol and 5.7 parts by weight of isophorone diamine. The reaction was further conducted for 20 minutes and terminated by addition of 2.1 parts by weight of n-butylamine to give a polyurethane resin solution (T). The molecular weight of the polyurethane resin was 26,000.

COMPARATIVE EXAMPLE 6

A four-necked flask equipped with an agitator, a thermometer, a Dimroth condenser and a gas introduction pipe was charged with 41.2 parts by weight of isophorone diisocyanate, 200 parts by weight of a polybutylene adipate diol having a molecular weight of 6,000 prepared from adipic acid and 1,4-butanediol, and 6.3 parts by weight of 1,4-butanediol. The reaction was conducted at 100° C. for 10 hours while introducing nitrogen gas. After cooling of the reaction mixture, 202 parts by weight of toluene and 202 parts by weight of methyl ethyl ketone were added to uniformly dissolve the reaction mixture, followed by addition of 202 parts by weight of isopropyl alcohol and 11.4 parts by weight of isophorone diamine. The reaction was further conducted for 20 minutes and terminated by addition of 2.0 parts by weight of n-butylamine to give a polyurethane resin solution (U). The molecular weight of the polyurethane resin was 29,000.

COMPARATIVE EXAMPLE 7

A four-necked flask equipped with an agitator, a thermometer, a Dimroth condenser and a gas introduction pipe was charged with 23.6 parts by weight of isophorone diisocyanate, 200 parts by weight of a polybutylene adipate diol having a molecular weight of 6,000 prepared from adipic acid and 1,4-butanediol, and 4.4 parts by weight of 1,4-butanediol. The reaction was conducted at 100° C. for 10 hours while introducing nitrogen gas. After cooling of the reaction mixture, 180 parts by weight of toluene and 180 parts by weight of methyl ethyl ketone were added to uniformly dissolve the reaction mixture, followed by addition of 180 parts by weight of isopropyl alcohol and 2.8 parts by weight of isophorone diamine. The reaction was further conducted for 20 minutes and terminated by addition of 1.1 parts by weight of n-butylamine to give a polyurethane resin solution (V). The molecular weight of the polyurethane resin was 22,000.

COMPARATIVE EXAMPLE 8

A four-necked flask equipped with an agitator, a thermometer, a Dimroth condenser and a gas introduction pipe was charged with 40.0 parts by weight of isophorone diisocyanate and 200 parts by weight of a polycaprolactone diol having a molecular weight of 2,000. The reaction was conducted at 100° C. for 10 hours while introducing nitrogen gas. After cooling of the reaction mixture, 193 parts by weight of toluene and 193 parts by weight of methyl ethyl ketone were added to uniformly dissolve the reaction mixture, followed by addition of 193 parts by weight of isopropyl alcohol and 11.9 parts by weight of isophorone diamine. The reaction was further conducted for 20 minutes and terminated by addition of 1.5 parts by weight of n-butylamine to give a polyurethane resin solution (W). The molecular weight of the polyurethane resin was 6,000.

COMPARATIVE EXAMPLE 9

A four-necked flask equipped with an agitator, a thermometer, a Dimroth condenser and a gas introduction pipe was charged with 40.0 parts by weight of isophorone diisocyanate and 200 parts by weight of a polybutylene glycol having a molecular weight of 2,000. The reaction was conducted at 100° C. for 10 hours while introducing nitrogen gas. After cooling of the reaction mixture, 193 parts by weight of toluene and 193 parts by weight of methyl ethyl ketone were added to uniformly dissolve the reaction mixture, followed by addition of 193 parts by weight of isopropyl alcohol and 11.9 parts by weight of isophorone diamine. The reaction was further conducted for 20 minutes and terminated by addition of 1.5 parts by weight of n-butylamine to give a polyurethane resin solution (X). The molecular weight of the polyurethane resin was 25,000.

COMPARATIVE EXAMPLE 10

A four-necked flask equipped with an agitator, a thermometer, a Dimroth condenser and a gas introduction pipe was charged with 39.1 parts by weight of isophorone diisocyanate and 517 parts by weight of a polybutylene adipate diol having a molecular weight of 5,000 prepared from adipic acid and 1,4-butanediol. The reaction was conducted at 100° C. for 10 hours while introducing nitrogen gas. After cooling of the reaction mixture, 193 parts by weight of toluene and 193 parts by weight of methyl ethyl ketone were added to uniformly dissolve the reaction mixture, followed by addition of 193 parts by weight of isopropyl alcohol and 6.3 parts by weight of 1,4-butanediol. The reaction was further conducted for 20 minutes and terminated by addition of 1.5 parts by weight of n-butylamine to give a polyurethane resin solution (Y). Since the molecular weight of the polyurethane resin was less than 10,000, no evaluation test was conducted.

Preparation of Ink Compositions

Ink compositions were prepared using the respective polyurethane resin solutions (A) to (X) obtained in Examples 1 to 15 and Comparative Examples 1 to 9. That is, 30 parts by weight of each polyurethane resin solution, 25 parts by weight of isopropyl alcohol, 35 parts by weight of ethyl acetate and 10 parts by weight of cyanine blue pigment (C.I. 74100) were milled by means of a paint conditioner to give a blue ink.

With each blue ink was printed a biaxially stretched polypropylene film having a thickness of 30 μm (commercially available under tradename "P-2161" from TOYOBO CO., LTD., hereinafter referred to as "OPP film"), a polyethylene terephthalate film having a thickness of 12 μm (commercially available under tradename "E-5100" from TOYOBO CO., LTD., hereinafter referred to as "PET film") or a nylon film having a thickness of 15 μm (commercially available under tradename "N- 1102" from TOYOBO CO., LTD., hereinafter referred to as "NY film") by means of a gravure proof press wherein the depth of plate was 32 μm, made by Kabushiki Kaisha Higasitani Seisakusho. With respect to all blue inks, the blocking resistance and adaptability for boiling treatment were evaluated. The results thereof are shown in Table 1. With respect to the respective blue inks prepared by employing the polyurethane resin solutions obtained in Examples 1 to 10 and 12 to 15 and Comparative Examples 1 to 8 as a binder, the adaptability for retorting treatment was evaluated. The results thereof are shown in Table 1. The evaluation methods are as follows:

(1) Blocking resistance

The printed OPP film was overlapped onto an unprinted OPP film so that the inked surface of the former was brought into contact with the surface of the latter that was subjected to a corona-discharging treatment. The resulting assembly was allowed to stand under a load of 3 kg/cm$^2$ at 40° C. for one day. The unprinted OPP film was peeled off from the printed OPP film and the degree to which the ink film was transferred to the unprinted surface was observed.

A: The unprinted OPP film was smoothly peeled off and none of the ink film was transferred thereto.

B: The unprinted OPP film was not smoothly peeled off but none of the ink film was transferred thereto.

C: Less than 50% of the ink film was transferred.

D: 50 to 100% of the ink film was transferred.

(2) Adaptability for boiling treatment

An isocyanate type primer was applied onto the inked surface of the printed PET film or the printed NY film and a molten polyethylene was extruded thereon in a thickness of 40 μm by means of an extrusion laminating machine to give a laminated film.

The laminated film was made into a bag. The bag was filled with a mixture of water and an oil and sealed. The bag was heated in a hot water at 90° C. for 30 minutes. The boiling resistance was evaluated by observing whether delamination occurred in the appearance thereof.

A: No delamination occurred.

B: Pin hole-like delamination occurred.

C: Stripe-like delamination occurred.

D: Delamination occurred all over the surface.

(2) Adaptability for retorting treatment

An isocyanate type adhesive was applied onto the inked surface of the printed PET film or the printed NY film and a polyethylene film having a thickness of 60 μm was laminated thereon by means of an adhesive laminating machine to give a laminated film.

The laminated film was made into a bag. The bag was filled with a mixture of water and an oil and sealed. The bag was heated in a pressurized hot water at 120° C. for 30 minutes. The retorting resistance was evaluated by observing whether delamination occurred appearance thereof.

A: No delamination occurred.

B: Pin hole-like delamination occurred.

C: Stripe-like delamination occurred.

D: Delamination occurred all over the surface.

TABLE 1

|  | Ex. 1 | Ex. 2 | Ex. 3 | Ex. 4 | Ex. 5 | Ex. 6 | Ex. 7 | Ex. 8 |
|---|---|---|---|---|---|---|---|---|
| Polyurethane resin solution No. | A | B | C | D | E | F | G | H |
| Polyol compound |  |  |  |  |  |  |  |  |
| Molecular weight of high molecular weight polyol compound | 4,000 | 6,000 | 6,000 | 6,000 | 6,000 | 6,000 | 7,000 | 6,000 |

TABLE 1-continued

| | | | | | | | | |
|---|---|---|---|---|---|---|---|---|
| Molecular weight of low molecular weight polyol compound | 90 | 90 | 90 | 90 | 90 | 90 | 90 | 62 |
| Average molecular weight | 2,000 | 2,000 | 2,000 | 2,000 | 1,500 | 2,500 | 2,000 | 2,000 |
| I.I. to high molecular weight polyol compound | 3.1 | 4.6 | 4.6 | 4.0 | 5.24 | 3.9 | 5.4 | 4.6 |
| I.I. to both polyol compounds | 1.5 | 1.5 | 1.5 | 1.3 | 1.3 | 1.6 | 1.5 | 1.5 |
| Content of nitrogen derived from isocyanate group (wt %) | 1.74 | 1.74 | 1.74 | 1.56 | 1.93 | 1.52 | 1.74 | 1.74 |
| Blocking resistance | B | A | A | B | A | B | A | A |
| Adaptability for boiling treatment | | | | | | | | |
| PET | A | A | A | A | A | A | A | A |
| NY | A | A | A | A | A | A | A | A |
| Adaptability for retorting treatment | | | | | | | | |
| PET | A | A | A | A | A | A | A | A |
| NY | A | A | A | A | A | A | A | A |

| | Ex. 9 | Ex. 10 | Ex. 11 | Ex. 12 | Ex. 13 | Ex. 14 | Ex. 15 |
|---|---|---|---|---|---|---|---|
| Polyurethane resin solution No. | I | J | K | L | M | N | O |
| Polyol compound | | | | | | | |
| Molecular weight of high molecular weight polyol compound | 6,000 | 6,000 | 6,000 | 5,000 | 5,000 | 5,000 | 5,000 |
| Molecular weight of low molecular weight polyol compound | 118 | 90 | 90 | 90 | 90 | 90 | 90 |
| Average molecular weight | 2,000 | 2,000 | 2,000 | 1,700 | 1,700 | 1,700 | 1,700 |
| I.I. to high molecular weight polyol compound | 4.7 | 4.6 | 4.6 | 3.5 | 3.5 | 3.5 | 3.5 |
| I.I. to both polyol compounds | 1.5 | 1.5 | 1.5 | 1.5 | 1.5 | 1.5 | 1.5 |
| Content of nitrogen derived from isocyanate group (wt %) | 1.74 | 1.74 | 1.74 | 1.64 | 1.64 | 1.64 | 1.64 |
| Blocking resistance | A | A | B | B | A | A | A |
| Adaptability for boiling treatment | | | | | | | |
| PET | A | A | B | A | A | A | A |
| NY | A | A | B | A | A | A | A |
| Adaptability for retorting treatment | | | | | | | |
| PET | A | A | — | A | A | A | A |
| NY | A | A | — | A | A | A | A |

| | Comparative Examples | | | | | | | | |
|---|---|---|---|---|---|---|---|---|---|
| | 1 | 2 | 3 | 4 | 5 | 6 | 7 | 8 | 9 |
| Polyurethane resin solution No. | P | Q | R | S | T | U | V | W | X |
| Polyol compound | | | | | | | | | |
| Molecular weight of high molecular weight polyol compound | 2,000 | 2,000 | 6,000 | 6,000 | 6,000 | 6,000 | 6,000 | 2,000 | 2,000 |
| Molecular weight of low molecular weight polyol compound | — | 90 | 500 | 90 | 90 | 90 | 90 | — | — |
| Average molecular weight | 2,000 | 1,500 | 2,000 | 4,000 | 1,300 | 2,000 | 2,500 | 2,000 | 2,000 |

TABLE 1-continued

|  | | | | | | | | | |
|---|---|---|---|---|---|---|---|---|---|
| I.I. to high molecular weight polyol compound | — | 1.8 | 5.9 | 3.3 | 6.3 | 5.6 | 3.2 | — | — |
| I.I. to both polyol compounds | 1.7 | 1.3 | 1.6 | 2.0 | 1.3 | 1.8 | 1.3 | 1.8 | 1.8 |
| Content of nitrogen derived from isocyanate group (wt %) | 1.91 | 1.98 | 1.82 | 1.32 | 2.22 | 1.99 | 1.20 | 1.91 | 1.91 |
| Blocking resistance | C | B | D | D | A | B | D | B | B |
| Adaptability for boiling treatment | | | | | | | | | |
| PET | B | B | A | A | D | C | A | C | D |
| NY | C | C | B | A | D | D | A | D | D |
| Adaptability for retorting treatment | | | | | | | | | |
| PET | C | C | B | A | D | C | A | C | — |
| NY | D | D | C | A | D | D | A | D | — |

As is clear from the results shown in Table 1, the ink composition of the present invention wherein the specific polyurethane resin having dense portions and sparse portions of urethane bond in a molecule is used as a binder exhibits an excellent blocking resistance and an excellent adaptability for boiling or retorting treatment which meet the requirements when the ink composition is used as a one-component ink for printing a variety of plastic films or sheets.

In addition to the materials and ingredients used in the Examples, other materials and ingredients can be used in the Examples as set forth in the specification to obtain substantially the same results.

What we claimed is:

1. A printing ink composition for a laminate comprising a polyurethane resin, a coloring agent and an organic solvent as the essential ingredients, the polyurethane resin being a reaction product of a high molecular weight diol compound having a number average molecular weight of 3,000 to 10,000, a low molecular weight diol compound having a molecular weight of not more than 120, an organic diisocyanate compound, a chain extender, and optionally a reaction terminating agent, wherein the whole of the high molecular weight diol compound and the low molecular weight diol compound has a specific average molecular weight (Msp) of 1,500 to 2,700, the specific average molecular weight (Msp) being calculated according to the formula:

$$Msp = Mw(H) \times Mf(H) + Mw(L) \times Mf(L)$$

wherein the abbreviations means the following:

Mw(H): Number average molecular weight of the high molecular weight diol compound,
Mf(H): Mole fraction of the high molecular weight diol compound,
Mw(L): Molecular weight of the low molecular weight diol compound,
Mf(L): Mole fraction of the low molecular weight diol compound, the isocyanate index (I.I.) of the organic diisocyanate compound to the high molecular weight diol compound wherein the isocyanate index (I.I.) means a ratio of the number of equivalents of isocyanate group/the number of equivalents of hydroxyl group, satisfies the following condition: I.I.>2.0; and the nitrogen content of the polyurethane resin derived from the isocyanate group of the organic diisocyanate compound is from 1.30 to 1.95% by weight.

2. The printing ink composition of claim 1, wherein the nitrogen content of the polyurethane resin is from 1.55 to 1.80% by weight.

3. The printing ink composition of claim 1, wherein the number average molecular weight of the polyurethane resin is from 10,000 to 100,000.

4. The printing ink, composition of claim 1, wherein the contents of the polyurethane resin and the coloring agent are from 5 to 20% by weight and from 1 to 50% by weight, respectively.

5. The printing ink composition of claim 1, wherein the low molecular weight diol compound is at least one diol selected from the group consisting of ethylene glycol, 1,2-propanediol, 1,3-propanediol, 1,3-butanediol, 1,4-butanediol, neopentyl glycol, pentanediol, 3-methyl-1,5-pentanediol, hexanediol, 1,3-cyclohexanediol and 1,4-cyclohexanediol.

6. The printing ink composition of claim 5, wherein the low molecular weight diol compound is used in combination with at least one member selected from the group consisting of glycerin, trimethylolpropane, trimethylolethane, 1,2,3-butanetriol, pentaerythritol and sorbitol.

7. The printing ink composition of claim 1, wherein the organic diisocyanate compound is at least one of an alicylic diisocyanate and an aroaliphatic diisocyanate.

* * * * *